United States Patent
Kim et al.

(10) Patent No.: US 7,271,236 B2
(45) Date of Patent: Sep. 18, 2007

(54) PREPARATION METHOD OF POLYESTER RESIN

(75) Inventors: Sang-woo Kim, Seoul (KR);
Kyung-yol Yon, Seongnam-si (KR);
Young-ho Lee, Pyeongtaek-si (KR);
Seong-geun Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/227,080

(22) Filed: Sep. 16, 2005

(65) Prior Publication Data

US 2006/0063088 A1 Mar. 23, 2006

(30) Foreign Application Priority Data

Sep. 21, 2004 (KR) .................. 10-2004-0075700

(51) Int. Cl.
*C08G 63/02* (2006.01)
*C08G 63/183* (2006.01)
*C08G 63/195* (2006.01)

(52) U.S. Cl. .............. 528/272; 528/308.1; 528/308.3; 528/308.8; 528/485; 528/486; 528/502 R; 430/109; 430/137; 428/402; 428/424.4

(58) Field of Classification Search .......... 528/272, 528/308.1, 308.3, 308.8, 485, 486, 502 R; 430/109.4, 137, 109; 428/402, 424.4
See application file for complete search history.

(56) References Cited

U.S. PATENT DOCUMENTS

| 4,968,575 | A | 11/1990 | Matsumura et al. |
| 4,981,939 | A | 1/1991 | Matsumura et al. |
| 6,120,967 | A | 9/2000 | Hopper et al. |
| 6,203,957 | B1 | 3/2001 | Nomura et al. |
| 6,287,742 | B1 | 9/2001 | Yoon |
| 6,660,443 | B2 | 12/2003 | Sugiyama et al. |
| 2003/0039910 | A1 | 2/2003 | Shirai et al. |

FOREIGN PATENT DOCUMENTS

| JP | 03-297946 | 11/1991 |
| JP | 04-307557 | 10/1992 |
| JP | 07-271083 | 10/1995 |
| JP | 08253596 | 10/1996 |
| JP | 10-339970 | 12/1998 |
| KR | 2003-0049627 | 6/2003 |
| WO | 03/052520 | 6/2003 |

OTHER PUBLICATIONS

European Search Report dated Nov. 23, 2005 for corresponding European Patent Application No. 05255829.3 filed on Sep. 21, 2005.
Chinese Patent Office Action, mailed Feb. 9, 2007, and issued in corresponding Chinese Patent Application No. 2005101097842.

*Primary Examiner*—Duc Truong
(74) *Attorney, Agent, or Firm*—Staas & Halsey LLP

(57) ABSTRACT

A preparation method of a polyester resin includes: under predetermined depolymerization conditions, mixing a polyester resin, a resin dissolvent and a polycondensation catalyst to depolymerize the polyester resin and form a first reaction mixture; adding a first monomer to the first reaction mixture to form a second reaction mixture; under predetermined polymerization conditions, adding a second monomer to the second reaction mixture to polymerize the depolymerized polyester resin and form a third reaction mixture; and adding a neutralizing agent to neutralize the polymerized reaction product of the third reaction mixture.

31 Claims, No Drawings

PREPARATION METHOD OF POLYESTER RESIN

CROSS-REFERENCE TO RELATED APPLICATIONS

This application claims benefit under 35 U.S.C. § 119 from Korean Patent Application No. 2004-75700, filed on Sep. 21, 2004, the entire content of which is incorporated herein by reference.

BACKGROUND OF THE INVENTION

1. Field of the Invention

The present invention relates in general to a preparation method of a polyester resin, more particularly, to a preparation method of a polyester resin particles for dry toner preparation used in printers.

2. Description of the Related Art

Toners for laser beam printers are largely classified into two groups: dry toners and liquid toners. Dry toners usually contain binder resins, colorants and other additives.

Among them, the binder resin comprises approximately 90 wt. % of the total weight of the toner, and is responsible for fixing toner particles onto a printing paper. Therefore, the binder resin is the key ingredient having the biggest influence on the performance of the toner. Depending on the preparation method of the toner, different kinds of binder resins are used.

The colorant provides a color to the toner. Colorants are secondary processed products that are prepared by adding a vehicle, a resin and a stabilizing agent to dyestuff or pigments in general. Dyestuff is a coloring matter having an affinity for a fiber, namely, dyeability, and generally contains aromatic rings. The pigment is a coloring powder in white or other colors that is insoluble both in water and oil. The pigment imparts color perceivable by the human eye by selectively reflecting or transmitting visible rays with the chemical structure or particles. Although the pigment has extremely fine particles, unlike the dyestuff, it is insoluble in many solvents, and therefore requires a vehicle. In general, the colorant used in the toner preparation is a pigment.

Colorants provide different colors such as carbon black, and other colors, such as blue, brown, cyan, green, purple, magenta, red, yellow and mixed colors thereof. Examples of pigments include anthraquinone, phthalocyanine blue, phthalocyanine green, diazos, monoazos, pyranthrone, perylene, quinacridone, and indigo pigments.

Besides the above-described ingredients, the toner may contain other additives for improving physical properties. For instance, one of the additives in the toner is a releasing agent, which gives a quick release between a roller and a toner when a toner image is transferred and fixed onto a recording medium, to prevent a toner offset. Many times, the recording medium adheres to the roller due to the toner, so that the recording medium is readily caught in the middle. However, with the releasing agent, this problem may be easily solved and prevented. Wax is generally used for the releasing agent.

There are diverse methods for preparing a dry toner. As far as the toner is concerned, characteristics of the toner particles, such as shape and size, are very important since they are very closely related to the resolution of a final print image. To get a high resolution image, toner particles must be spherical and as uniform as possible. Therefore, there is considerable interest in developing a preparation method for more spherical, finer, and a more uniform range size distribution of toner particles.

In general, the preparation methods of a dry toner are classified into pulverization, polymerization and other chemical methods. According to the pulverization (or milling) method, a binder resin, a colorant, a charge control agent and other additives are preliminarily mixed, uniformly dispersed, and pulverized again.

In consideration of the aforementioned requirements of toner particle characteristics, the toner produced by pulverization has several problems, such as great variations of particle size and shape, and poor yield from the final pulverization process. Therefore, it is difficult to obtain uniformly spherical fine toner articles.

Taking the above shortcomings of the pulverization method into account, a polymerization method would be preferable in preparation of toner particles. According to the polymerization method, raw materials for toner preparation are mixed and polymerized. Examples of the polymerization method include suspension polymerization and emulsion polymerization.

The suspension polymerization is a method wherein water-insoluble monomers are converted into about 10 μm-diameter oil droplets and dispersed in water for polymerization. The method uses a lipophilic polymerization initiator and requires a vehicle for stabilizing the oil droplets.

The emulsion polymerization is a method wherein oil-soluble monomers are emulsified by utilizing an emulsifying agent, and polymerization is initiated with a water-soluble initiator. An 'emulsifying agent' includes all the substances that make two non-mixable liquids into a stable emulsion, such as a surfactant which emulsifies water and a water-insoluble organic matter together. A surfactant is an additive that easily adsorbs to the surface and forms micelles when exceeding a critical micelle concentration.

As a rule, the emulsion polymerization takes place in the micelles containing monomer, resulting in polymers of a high degree of polymerization. A micelle is formed as the molecules or ions of surfactants in the aqueous phase aggregate when they reach the critical micelle concentration. In the aqueous phase, a polymerization initiator is radicalized, and a monomer bonded to the radicalized initiator is trapped in the micelle for polymerization. Since the polymerization of monomers takes place within the micelle, the emulsion polymerization method is also applicable to synthesis of submicroscopic micro gel (tens of nm in diameter).

When a toner is prepared by emulsion polymerization, latex is usually used as the binder resin. Latex is the milky white fluid contained in the tissue beneath the bark of the Para rubber tree or Hevea brasiliensis. Rubber particles are dispersed in water (the dispersion medium) forming a colloid phase. Latex is used as a generic name for natural rubber latex, synthetic rubber, and synthetic resin emulsions of a non-rubber group. Examples of monomers used in production of latex are styrene, divinyl benzene, n-butyl acrylate, methacrylate and acrylic acid.

Toner preparation based on the emulsion polymerization method using latex as the binder resin is disclosed in U.S. Pat. No. 6,120,967. According to the disclosure, a monomer selected from a group consisting of styrene, butyl acrylate, and acrylic acid is mixed with an anionic surfactant and an initiator, and the mixture undergoes a polymerization reaction at a predetermined polymerization temperature to produce latex, the binder resin. The produced latex is then mixed with a colorant and a wax that is used as a releasing agent. Later, a coagulant is added to the emulsion for agglomeration, and the resulting agglomerated particles are melted to produce a toner.

As mentioned earlier, compared to other preparation methods, the emulsion polymerization method using latex is more useful for producing fine and uniform spherical particles. Although there is a variety of monomers that may be readily used or commercially available for the emulsion polymerization, styrene/acrylate latex is used most frequently.

Styrene is a general purpose material used in the chemical engineering of resins, synthetic rubbers and paints. Acrylic acid is an easy-to-polymerize material obtained by the direct oxidation of propylene or hydrolysis of acrylonitrile with sulfuric acid. Therefore, styrene and acrylic acid (methacrylic acid) are often used in the production of latex products. To use styrene/acrylate(methacrylate) latex resin for the toner, however, high-level physical properties in thermal or mechanical aspects are required. Also, the low-transparency of the styrene/acrylate(methacrylate) latex resin may present a problem for expressing a color of the toner. Developed later as an answer to the problem is a polyester resin.

U.S. Pat. No. 6,203,957 disclosed a toner preparation method using a polyester resin as a binder resin. According to the disclosure, monomers were polymerized to produce a self-dispersive polyester resin in water. The polyester resin was then dissolved in an organic solvent and mixed with aqueous ammonia as a neutralizing agent. The mixture was dropped into a aqueous medium containing acid to form particles. The resulting particles were filtered, dried, and mixed with a colorant and other additive(s) to produce toner particles.

It is a known fact that polyester resin has superior thermal and mechanical physical properties and excellent color expressive power compared to the existing styrene/acrylate latex. However, the preparation method of polyester resin is somewhat questionable. For instance, U.S. Pat. No. 6,203,957 suggested that a polyester resin should be dissolved in an organic solvent that dissolves the polyester resin, and then dispersed in an aqueous medium. In effect, this is the basis of the production of polyester resin for use in a toner. A frequently used organic solvent for polyester resin is tetrahydrofuran (THF), which is a hazardous substance causing severe damage to the body of a user and environment contamination problems.

In addition, when a toner is produced using the conventional polyester binder resin, it is very difficult to produce fine particles with a diameter of less than 1 μm from the dispersion. Thus, the aforementioned emulsion polymerization method becomes ineffective.

Therefore, there exists a need to develop a new preparation method of a dry toner using a polyester resin as a binder resin, in which the dissolution step in an organic solvent (that is not environmentally friendly) is removed, and emulsion polymerization is used.

SUMMARY OF THE INVENTION

It is, therefore, an aspect of the present invention to provide a preparation method of a polyester resin particle, in which polyester resin particles are dissolved in a resin dissolvent, not in a hazardous organic solvent, for polymerization, and dispersed in a surfactant.

Another aspect of the present invention is to provide a polyester resin obtained by a preparation method according to an embodiment of the present invention.

Still another aspect of the present invention is to provide a polyester particle dispersion containing polyester resin obtained by the present invention, a reverse-neutralizing agent, and a surfactant.

To achieve the above aspects and advantages, a preparation method of a polyester resin includes: under predetermined depolymerization conditions, mixing a polyester resin, a resin dissolvent and a polycondensation catalyst to depolymerize the polyester resin to form a first reaction mixture; adding a first monomer to the first reaction mixture to form a second reaction mixture; under predetermined polymerization conditions, adding a second monomer to the second reaction mixture to polymerize the depolymerized polyester resin to form a third reaction mixture; and adding a neutralizing agent to neutralize the polymerized reaction product of the third reaction mixture.

Preferably, the polyester resin in the first reaction mixture is selected from a group consisting of bisphenol A polyester resins and polyethylene terephthalate (PET) polyester resins, and the resin dissolvent is selected from a group consisting of gum rosins, wood rosins, tall rosins, rosin esters, and $C_5$ to $C_9$ petroleum resins.

Preferably, the polycondensation catalyst is dibutyltinoxide (DBTO), and the first and second monomers are polycondensing monomers. Also, the first monomer is selected from a group consisting of maleic acid, phthalic anhydride, isophthalic acid, and terephthalic acid.

Moreover, the second monomer is selected from a group consisting of ethylene glycol, propylene glycol, and bisphenol A alkylene oxide (bisphenol A-EO).

Preferably, the neutralizing agent is a basic compound selected from a group consisting of sodium hydroxide, potassium hydroxide, lithium hydroxide, calcium hydroxide, sodium carbonate, and ammonia. Preferably, a ratio of the resin dissolvent to the polyester resin ranges 1:9 to 9:1 by weight.

Another aspect of the present invention provides a polyester resin obtained by the preparation method of an embodiment of the present invention.

Still another aspect of the present invention provides a polyester particle dispersion containing a polyester resin obtained by an embodiment of the preparation method of claim 1, a reverse-neutralizing agent, and a surfactant.

Also, the reverse-neutralizing agent is an acid, preferably, hydrochloric acid. Preferably, the surfactant is selected from a group consisting of sodium dodecyl sulfate, sodium 4-dodecylbenzene sulfonate, Tween 20® (polyoxyethylene sorbitan monolaurate) and Triton X-100® (alkylaryl polyester alcohol).

Preferably, the polyester particle is 50 nm to 300 nm in diameter, and the dispersion has a glass transition temperature in a range from 40° C. to 100° C.

Additional aspects and/or advantages of the invention will be set forth in part in the description which follows and, in part, will be apparent from the description, or may be learned by practice of the invention.

DETAILED DESCRIPTION OF THE PREFERRED EMBODIMENTS

An example of the present invention will be described herein below.

Unlike the related art preparation methods of a polyester resin, the present invention implements a new preparation method of a polyester resin without using any hazardous organic solvent that can cause damage to a human body and increase environmental contamination. Originally, an organic solvent was used for dissolving the polyester resin. However, the present invention uses a resin dissolvent instead of the organic solvent, for depolymerizing and dissolving the polyester resin.

Preferably, a polyester resin used for producing polyester particles is selected from a group that consists of bisphenol A polyester resins and polyethylene terephthalate (PET) polyester resins. However, other suitable polyester resins may also be used.

A preferable example of the resin dissolvent is a rosin. The rosin is a natural resin that is obtained from pines (pine resin), and comprises resin acids, especially abietic acid. Since the rosin has a low softening point and a high acid number, it is often used in a plurality of derivative forms. Examples of resin dissolvent include gum rosin, wood rosin, tall rosin, rosin ester, and $C_5$ to $C_9$ petroleum rosin. These examples are for illustrative purposes only, so that the resin dissolvent is not limited thereto. The resin dissolvent depolymerizes the polyester resin.

The polyester resin is mixed with the resin dissolvent with the aid of a polycondensation catalyst. Examples of the polycondensation catalyst include dibutyltinoxide (DBTO) and other suitable catalysts. Briefly, under predetermined depolymerization conditions, the polyester resin is depolymerized by the resin dissolvent, and the depolymerized resin is polymerized again with a monomer, aided by the polycondensation catalyst.

More specifically, a first monomer of a polybasic acid is added to the mixture of the depolymerized resin and the polycondensation catalyst. Then, a polyhydric alcohol is used as a second monomer to cause another polycondensation reaction to the polyester resin. Examples of the polybasic acid used as the first monomer are maleic acid, phthalic anhydride, isophthalic acid, terephthalic acid, and other suitable polybasic acids.

After the first monomer is added, the second monomer is put into the reactant. This operation is performed to form a polyester resin again out of the resin which is depolymerized using the resin dissolvent, and not an organic solvent as in the related art method. Examples of the polyhydric alcohol corresponding to the polybasic acid of the first monomer are ethylene glycol, propylene glycol, bisphenol A alkylene oxide, and other suitable polyhydric alcohols. The polymerization at this time is performed through a polycondensation reaction.

Then, a neutralizing agent is added to neutralize the polyester resin being produced. Here, the neutralizing agent is a basic compound, and is selected from a group that consists of sodium hydroxide, potassium hydroxide, lithium hydroxide, calcium hydroxide, sodium carbonate, ammonia and other suitable basic compounds.

In detail, to prepare a polyester resin, a polyester resin, a rosin, and DBTO are put into a reactor, and stirred at a reaction temperature for a sufficient amount of time to make sure the depolymerization is fully performed. When the reaction mixture becomes transparent, the temperature is lowered and a first monomer is put into the reactor. Then, the temperature is raised up to the predetermined reaction temperature, and the reaction continues for a predetermined amount of time to complete the polymerization reaction.

When the reaction is complete, a second monomer is put into the reactor and the reaction continues at a predetermined reaction temperature for a predetermined amount of time. After the polycondensation has continued for a predetermined time, the temperature is lowered and a neutralizing agent is added to the reactor. Then, the mixture is stirred for a predetermined amount of time to produce a water-soluble polyester resin dispersion.

By the time the above-described method is completed, the polyester resin used as a start material of the reaction is dissolved to become a water-soluble resin dispersion. At this time, no organic solvent is used for dissolving the polyester resin. Thusly prepared polyester resin forms particles for a binder resin used in the production of a toner.

The present invention further provides a polyester resin that is prepared by embodiments of the above-described method. The polyester resin dispersion includes a polyester resin, a resin dissolvent, a monomer, and a neutralizing agent.

According to another example of the present invention, a polyester particle dispersion may be prepared using a water-soluble polyester resin dispersion that is obtained from the present invention without using any organic solvent.

The resin dispersion neutralized by a basic neutralizing agent is reverse-neutralized using an acid, and mixed with a surfactant. Consequently, the surface of a polyester resin particle is negatively charged. In detail, the water-soluble polyester resin dispersion, which was neutralized at the last operation by the basic neutralizer, is now neutralized reversely using a reverse-neutralizing agent to use a surfactant. Any acid such as hydrochloric acid or other suitable acids capable of reverse-neutralizing the basic water-soluble polyester resin dispersion may be used as the reverse-neutralizing agent.

The surfactant is a kind of emulsifying agent. Examples of the surfactant that may be applied to the present invention may be selected from a group consisting of sodium dodecyl sulfate, sodium 4-dodecylbenzene sulfonate, Tween 20® (polyoxyethylene sorbitan monolaurate), and Triton X-100® (alkylaryl polyester alcohol). These examples are for illustrative purposes only, so that the surfactants are not limited thereto. As for a dispersion medium for dispersing resin particles, deionized water is generally used.

The reverse-neutralized resin particle is surrounded by a surfactant and has a negative charge overall, so that it may be aggregated by an aggregating agent. Moreover, the particle size of the resin obtained by the present invention method is in nm, which is much smaller than-the particle size (1 μm) of the dispersion obtained by the related art preparation method of polyester resin. The thusly prepared dispersion is similar to latex for use in the emulsion polymerization, and it is mixed with the aggregation agent and other additives to form toner particles.

Preferably, the particle size of the polyester is smaller than 1 μm, more preferably, in a range from 50 nm to 300 nm. Also, the glass transition temperature of the resin particle is preferably 40° C. to 100° C. This range is carefully determined because when the glass transition temperature is lower than 40° C., the thermal resistance/viscosity of the final toner prepared by using the polyester particles of embodiments of the present invention are insufficient, whereas when the glass transition temperature is higher than 100° C., the final toner shows poor fixability.

According to still another example, a polyester particle dispersion may be prepared by adding a reverse-neutralizing agent to a polyester resin; and adding a surfactant to the reverse-neutralized mixture.

In detail, a reverse-neutralizing agent and a surfactant are dissolved in distilled water to prepare an acidic aqueous solution. Meanwhile, the acidic aqueous solution is slowly added while the water-soluble polyester resin dispersion prepared earlier is stirred at a high speed. Then, the surfactant causes the polyester particle size to be smaller than 1 μm.

The polyester particles are mixed with a colorant, a charge control agent, an aggregating agent and other additives under proper conditions, and produce a dry toner including the polyester resin obtained by embodiments of the present invention.

The preparation methods of polyester resin and its particles, and a liquid toner containing the same will now be described in greater detail in reference to the examples below.

EXAMPLES

The following examples explain the preparation methods of polyester resin dispersion and the particle dispersion using the same in accordance with embodiments of the present invention. In particular, Examples 2 to 4 are modified from Example 1 by applying different surfactants.

Example 1

100 g of a polyester binder resin, 100 g of a rosin, and 0.5 g of DBTO were put into a reactor, and stirred and reacted at a temperature between 235° C. and 245° C. for about 2 hours at about 250 rpm. When the mixture became transparent, it was cooled to approximately 150° C., and 40 g of maleic acid was added thereto. Then, the temperature was raised to a temperature range of 235° C. to 245° C., and the secondary depolymerization reaction was continued for about 3 hours.

When the reaction time was over, 35 g of bisphenol A-EO was added thereto, and the reaction was further continued for about 5 hours at a temperature between 235° C. and 245° C. When the polycondensation reaction proceeded to a predetermined degree, the reaction product was cooled to about 85° C. Then, a basic solution prepared by dissolving 35 g of sodium hydroxide in 200 g of distilled water was added thereto and stirred for about 30 minutes at about 400 rpm, to prepare a water-soluble polyester resin dispersion.

Next, 40 g of HCl and 0.8 g to 40 g of sodium dodecyl sulfate were dissolved in 800 g of distilled water, to prepare an acidic aqueous solution. At a temperature of approximately 25° C., the polyester resin dispersion was stirred at a high speed, and the above-obtained aqueous solution was slowly added to the acidic aqueous solution, to produce fine particles having a volume average particle diameter of about 253 nm.

Example 2

The procedure for preparation of the particles in Example 1 was repeated, except that 0.8 to 40 g of sodium 4-dodecylbenzene sulfonate was used as a surfactant instead of sodium dodecyl sulfate. A volume average particle diameter obtained was about 180 nm.

Example 3

The procedure for preparation of the particles in Example 1 was repeated, except that 0.8 to 40 g of Tween 20® was used as a surfactant instead of sodium dodecyl sulfate. A volume average particle diameter obtained was about 151 nm.

Example 4

The procedure for preparation of the particles in Example 1 was repeated except that 0.8 to 40 g of Triton X-100® was used as a surfactant instead of sodium dodecyl sulfate. A volume average particle diameter obtained was about 165 nm.

Evaluation

Measurement of Volume Average Particle Diameter

The volume average particle diameter of the toner particles was measured using an instrument HORIBA910, the particle size distribution analyzer, from HORIBA INSTRUMENTS, INC. The measurement results are shown in Table 1 below.

TABLE 1

| Surfactant | | Volume average particle diameter (nm) |
|---|---|---|
| Example 1 | Sodium dodecyl sulfate | 253 |
| Example 2 | sodium 4-dodecylbenzene sulfonate | 180 |
| Example 3 | Tween 20 ® | 151 |
| Example 4 | Triton X-100 ® | 165 |

As may be seen in Table 1, when a surfactant is used for the preparation of a polyester particle dispersion of embodiments of the present invention, the size of the prepared particles in each example was in nm. Therefore, it was confirmed that the surfactant, although the kind of the surfactant used was different, was responsible for controlling the particle size.

Therefore, compared with the related art binder resin using a polyester resin, the polyester resin particles obtained by the embodiments of the present invention have sizes in nm, which is even smaller than the requirement particles size (i.e., ≦1 μm) for the emulsion polymerization.

As explained earlier, as for the preparation of a polyester resin as the binder resin for use in the production of a toner, the present invention utilized the resin dissolvent for dissolving the polyester resin, as opposed to an organic solvent as was utilized in the related art. Thus, it becomes possible to avoid the usage of hazardous and environmentally unfriendly organic solvents that may cause severe damage to the human body of the user and environment contamination problems. Moreover, the particle size of the resin obtained by the preparation method of the present invention is much smaller than 1 μm, so the resin particles of the invention are suitable for the toner production based on the emulsion polymerization.

The foregoing example and advantages are merely exemplary and are not to be construed as limiting the present invention. The present teaching may be readily applied to other types of apparatuses. Also, the description of the examples of the present invention is intended to be illustrative, and not to limit the scope of the claims, and many alternatives, modifications, and variations will be apparent to those skilled in the art without departing from the principles and spirit of the invention, the scope of which is defined in the claims and their equivalents.

What is claimed is:

1. A preparation method of a polyester resin, the method comprising:
    under predetermined depolymerization conditions, mixing a polyester resin, a resin dissolvent and a polycondensation catalyst to depolymerize the polyester resin to form a first reaction mixture;

adding a first monomer to the first reaction mixture to form a second reaction mixture;

under predetermined polymerization conditions, adding a second monomer to the second reaction mixture to polymerize the depolymerized polyester resin with the first and second monomers and form a polymerized reaction product; and adding a neutralizing agent to neutralize the polymerized reaction product wherein the obtained polyester resin has particles with a predetermined volume average particle diameter that is less than 1 µm.

2. The method according to claim 1, wherein the polyester resin in the first reaction mixture is selected from the group consisting of bisphenol A polyester resins and polyethylene terephthalate (PET) polyester resins.

3. The method according to claim 1, wherein the resin dissolvent is selected from the group consisting of gum resins, wood resins, tall rosins, rosin esters, and $C_5$ to $C_9$ petroleum resins.

4. The method according to claim 1, wherein the polycondensation catalyst is dibutyltinoxide (DBTO).

5. The method according to claim 1, wherein the first and second monomers are polycondensing monomers.

6. The method according to claim 1, wherein the first monomer is selected from the group consisting of maleic acid, phthalic anhydride, isophthalic acid, and terephthalic acid.

7. The method according to claim 1, wherein the second monomer is selected from the group consisting of ethylene glycol, propylene glycol, and bisphenol A alkylene oxide.

8. The method according to claim 1, wherein the neutralizing agent is a basic compound.

9. The method according to claim 8, wherein the basic compound is selected from the group consisting of sodium hydroxide, potassium hydroxide, lithium hydroxide, calcium hydroxide, sodium carbonate, and ammonia.

10. The method according to claim 1, wherein a ratio of the resin dissolvent to the polyester resin ranges from 1:9 to 9:1 by weight.

11. A polyester resin obtained by a preparation method comprising:

under predetermined depolymerization conditions, mixing an initial polyester resin, a resin dissolvent and a polycondensation catalyst to depolymerize the initial polyester resin to form a first reaction mixture;

adding a first monomer to the first reaction mixture to form a second reaction mixture;

under predetermined polymerization conditions, adding a second monomer to the second reaction mixture to polymerize the depolymerized polyester resin with the first and second monomers and form a polymerized reaction product; and adding a neutralizing agent to neutralize the polymerized reaction product, wherein the obtained polyester resin has particles with a predetermined volume average particle diameter that is less than 1 µm.

12. A polyester particle dispersion containing:

a polyester resin obtained by a preparation method comprising:

under predetermined depolymerization conditions, mixing an initial polyester resin, a resin dissolvent and a polycondensation catalyst to depolymerize the initial polyester resin to form a first reaction mixture;

adding a first monomer to the first reaction mixture to form a second reaction mixture;

under predetermined polymerization conditions, adding a second monomer to the second reaction mixture to polymerize the depolymerized polyester resin with the first and second monomers and form a polymerized reaction product; and adding a neutralizing agent to neutralize the polymerized reaction product, wherein the obtained polyester resin has particles with a predetermined volume average particle diameter that is less than 1 µm, a reverse-neutralizing agent; and a surfactant.

13. The dispersion according to claim 12, wherein the reverse-neutralizing agent is an acid.

14. The dispersion according to claim 13, wherein the acid is hydrochloric acid.

15. The dispersion according to claim 12, wherein the surfactant is selected from the group consisting of sodium dodecyl sulfate, sodium 4-dodecylbenzene sulfonate, polyoxyethylene sorbitan monolaurate and alkylaryl polyester alcohol.

16. The dispersion according to claim 12, wherein the polyester resin has particles which are 50 nm to 300 nm in diameter.

17. The dispersion according to claim 12, wherein the dispersion has a glass transition temperature in a temperature range from 40° C. to 100° C.

18. The dispersion according to claim 12, wherein;

the polyester resin has polyester particles; and the polyester particles have a volume average particle diameter in a range from 50 nm to 300 nm.

19. A method of preparing polyester resin particles for a dry toner, comprising operations in an order as recited below:

mixing a polyester resin, a resin dissolvent and a polycondensation catalyst to form a mixture to depolymerize the polyester resin, stirring at approximately 150-350 rpm and reacting at a temperature between 235° C. and 245° C. for a predetermined period of time until the mixture becomes transparent;

cooling the mixture to a predetermined temperature in a temperature range between 100° C. and 200° C. and adding a first monomer;

performing a secondary depolymerization reaction by heating the mixture with the first monomer at approximately 235° C. to 245° C. for a predetermined period of time;

forming a polycondensed product by adding a second monomer to the secondary depolymerization reaction and continuing to heat at approximately 235° C. to 245° C. for a predetermined period of time;

cooling the polycondensed product to a predetermined temperature in a temperature range between 50° C. and 100° C. and adding a basic solution to neutralize the polycondensed product and stirring for less than an hour at about 300-500 rpm; and adding, to the neutralized polycondensed product, a surfactant, a predetermined amount of acid, and a predetermined amount of distilled water and stirring at a predetermined temperature in a temperature range of 15° C. to 35° C. to prepare a dispersion of particles having a predetermined volume average particle diameter that is less than 1 µm.

20. The method of claim 19, wherein the polyester resin mixed with the resin dissolvent and the polycondensation catalyst is selected from the group consisting of bisphenol A polyester resins and polyethylene terephthalate (PET) polyester resins.

21. The method according to claim 19, wherein the resin dissolvent is selected from the group consisting of gum rosins, wood rosins, tall rosins, rosin esters, and $C_5$ to $C_9$ petroleum resins.

22. The method according to claim 19, wherein the polycondensation catalyst is dibutyltinoxide (DBTO).

23. The method according to claim 19, wherein the first monomer is selected from the group consisting of maleic acid, phthalic anhydride, isophthalic acid, and terephthalic acid.

24. The method according to claim 19, wherein the second monomer is selected from the group consisting of ethylene glycol, propylene glycol, and bisphenol A alkylene oxide.

25. The method according to claim 19, wherein the basic solution includes a basic compound selected from the group consisting of sodium hydroxide, potassium hydroxide, lithium hydroxide, calcium hydroxide, sodium carbonate, and ammonia.

26. The method according to claim 19, wherein a ratio of the resin dissolvent to the polyester resin ranges from 1:9 to 9:1 by weight.

27. The method according to claim 19, wherein the acid is hydrochloric acid.

28. The method according to claim 19, wherein the surfactant is selected from the group consisting of sodium dodecyl sulfate, sodium 4-dodecylbenzene sulfonate, polyoxyethylene sorbitan monolaurate and alkylpolyether alcohol.

29. A polyester resin particle dispersion utilizing polyester resin particles obtained by a method of preparing polyester resin particles for a dry toner, comprising operations in an order as recited below:

mixing a polyester resin, a resin dissolvent and a polycondensation catalyst to form a mixture to depolymerize the polyester resin, stirring at approximately 150-350 rpm and reacting at a temperature between 235° C. and 245° C. for a predetermined period of time until the mixture becomes transparent;

cooling the mixture to a predetermined temperature in a temperature range between 100° C. and 200° C. and adding a first monomer;

performing a secondary depolymerization reaction by heating the mixture with the first monomer at approximately 235° C. to 245° C. for a predetermined period of time;

forming a polycondensed product by adding a second monomer to the secondary depolymerization reaction and continuing to heat at approximately 235° C. to 245° C. for a predetermined period of time;

cooling the polycondensed product to a predetermined temperature in a temperature range between 50° C. and 100° C. and adding a basic solution to neutralize the polycondensed product and stirring for less than an hour at about 300-500 rpm; and adding, to the neutralized polycondensed product, a surfactant, a predetermined amount of acid, and a predetermined amount of distilled water and stirring at a predetermined temperature in a temperature range of 15° C. to 35° C. to prepare a dispersion of particles having a predetermined volume average particle diameter, wherein the obtained polyester resin has particles with a predetermined volume average particle diameter that is less than 1 μm.

30. The polyester particle dispersion according to claim 29, wherein the polyester resin particle dispersion has particles with a predetermined volume average particle diameter from about 50 nm to about 300 nm.

31. The polyester particle dispersion according to claim 29, wherein the dispersion has a glass transition temperature in a temperature range from about 40° C. to about 100° C.

* * * * *

UNITED STATES PATENT AND TRADEMARK OFFICE
CERTIFICATE OF CORRECTION

PATENT NO. : 7,271,236 B2 Page 1 of 1
APPLICATION NO. : 11/227080
DATED : September 18, 2007
INVENTOR(S) : Sang-woo Kim et al.

It is certified that error appears in the above-identified patent and that said Letters Patent is hereby corrected as shown below:

Column 9, Line 9, change "product" to --product,--.

Column 9, Line 18, before "wood" change "resins," to --rosins,--.

Column 9, Line 18, after "wood" change "resins," to --rosins,--.

Column 10, Line 28, change "wherein;" to --wherein:--.

Signed and Sealed this

Eighteenth Day of December, 2007

JON W. DUDAS
*Director of the United States Patent and Trademark Office*